(12) United States Patent
Lee et al.

(10) Patent No.: US 8,581,708 B2
(45) Date of Patent: Nov. 12, 2013

(54) REMOTELY CONTROLLABLE RECEPTACLE SYSTEM AND MANAGING METHOD FOR OPERATING THE SAME

(71) Applicant: Powertech Industrial Co., Ltd., Taipei Hsien (TW)

(72) Inventors: Yu-Lung Lee, Miaoli Couny (TW); Jung-Hui Hsu, Taipei County (TW); Chun Chuan Chen, Taipei County (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 13/848,930

(22) Filed: Mar. 22, 2013

(65) Prior Publication Data

US 2013/0214911 A1   Aug. 22, 2013

Related U.S. Application Data

(63) Continuation of application No. 12/828,491, filed on Jul. 1, 2010, now Pat. No. 8,427,283.

(30) Foreign Application Priority Data

Jan. 8, 2010   (TW) ................................ 99100356 A (51) Int. Cl.
*G05B 11/01*   (2006.01)
*G08B 1/08*   (2006.01)

(52) U.S. Cl.
USPC .................................. 340/12.22; 340/539.32

(58) Field of Classification Search
USPC ............... 340/12.2, 12.5, 32, 539.21, 539.22; 455/11
See application file for complete search history.

(56) References Cited

U.S. PATENT DOCUMENTS

| 4,539,706 | A | * | 9/1985 | Mears et al. ................. 455/11.1 |
| D411,169 | S | * | 6/1999 | West ......................... D13/139.8 |
| D497,881 | S | * | 11/2004 | Rishar .......................... D13/168 |
| D571,790 | S | * | 6/2008 | Yoshitake et al. ........... D14/218 |
| 7,453,357 | B2 | * | 11/2008 | Bernal-Silva et al. ... 340/539.32 |

(Continued)

FOREIGN PATENT DOCUMENTS

| TW | 353583 M | 3/2009 |
| TW | 369595 M | 11/2009 |

OTHER PUBLICATIONS

Communication From The Taiwan Patent Office Regarding a Counterpart Foreign Application Dated Nov. 27, 2012.

*Primary Examiner* — Tai T Nguyen
*Assistant Examiner* — Royit Yu
(74) *Attorney, Agent, or Firm* — Rosenberg, Klein & Lee (57) ABSTRACT

A remotely controllable receptacle system is disclosed. The remotely controllable receptacle system includes a remote control device for emitting a first request signal and a searching signal, and a plurality of receptacle devices for emitting a first reply signal according to the first request signal. The remote control device determines whether the first reply signal is received and the receptacle device emitting the first reply signal is classified as the vicinity receptacle device and the receptacle device not emitting the first reply signal is classified as the missing receptacle device. The vicinity receptacle device is configured to emit a second request signal according to the searching signal and determine whether the missing receptacle device emits a second reply signal according to the second request signal before a mutual communication between the remote control device and the missing receptacle device via the vicinity receptacle device is established.

4 Claims, 7 Drawing Sheets

(56) References Cited

U.S. PATENT DOCUMENTS

| | | | |
|---|---|---|---|
| 7,948,374 B2 * | 5/2011 | Chen | 340/539.32 |
| 8,106,541 B1 * | 1/2012 | Sarullo | 307/139 |
| 8,253,560 B2 * | 8/2012 | Howard et al. | 340/539.32 |
| 8,340,157 B2 * | 12/2012 | Arvidsson et al. | 375/133 |
| 2006/0170546 A1 * | 8/2006 | Clifford | 340/539.32 |
| 2007/0279220 A1 * | 12/2007 | Wilcox | 340/539.32 |
| 2009/0146494 A1 * | 6/2009 | Mori et al. | 307/38 |

* cited by examiner

REMOTELY CONTROLLABLE RECEPTACLE SYSTEM AND MANAGING METHOD FOR OPERATING THE SAME

RELATED APPLICATIONS

This application is a Continuation patent application of application Ser. No. 12/828,491, filed on 1 Jul. 2010, now U.S. Pat. No. 8,427,283. The entire disclosure of the prior application Ser. No. 12/828,491, from which an oath or declaration is supplied, is considered a part of the disclosure of the accompanying Divisional application and is hereby incorporated by reference.

BACKGROUND OF THE INVENTION

1. Field of the Invention

The present invention relates to a remotely controllable receptacle system and the managing method for operating the same. In particular, the present invention relates to remotely controllable receptacle system that is capable of remotely controlling the receptacle device via complementary transmission between the receptacle devices within the receptacle system.

2. Description of Related Art

Figure 1:
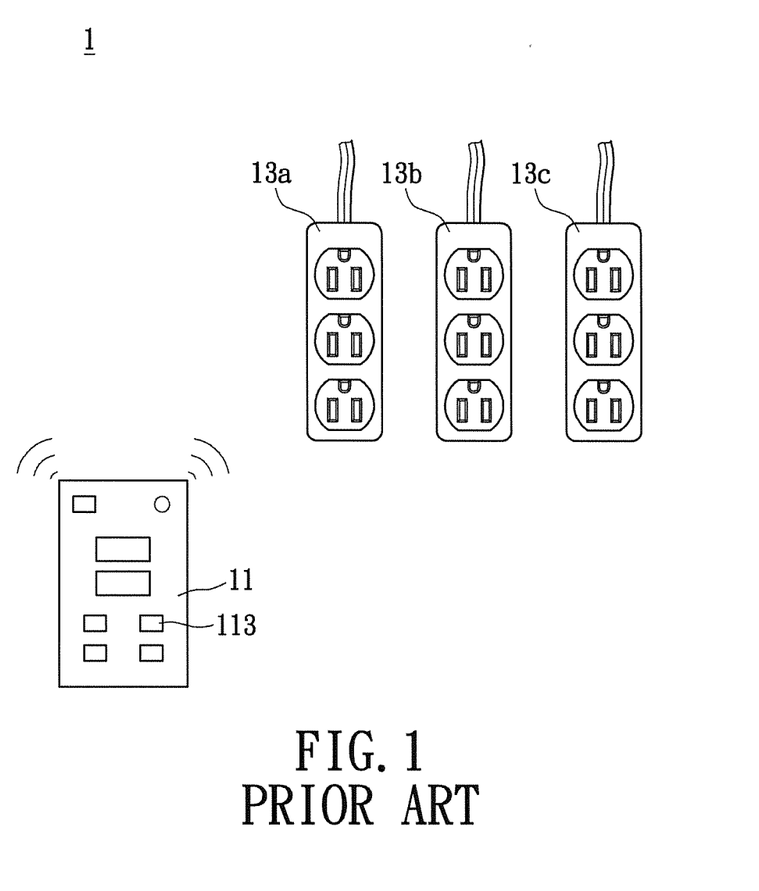
FIG. 1 is a schematic diagram of a conventional remotely controllable receptacle system.

A conventional remotely controllable receptacle system is shown in FIG. 1. The remotely controllable receptacle system 1 includes a remote control device 11 and a plurality of receptacle devices 13a, 13b, and 13c. The receptacle devices 13a, 13b, and 13c could be in-wall or a power strip receptacle devices connecting with a power source for supplying power to varied electronic equipments, and the remote control device 11 controls whether to connect the receptacle devices 13a, 13b, and 13c to the power source.

The conventional remotely controllable receptacle system 1 enables a mutual communication between the remote control device 11 and the receptacle devices 13a, 13b and 13c via wireless transmission. However, the remote control device 11 merely control the receptacle device 13a located within the transmission range of the wireless transmission. In other words, the distance between the remote control device 11 and the receptacle devices 13a, 13b, and 13c may limit the application of the conventional remotely controllable receptacle system 1. Plus, interferences such as obstacles and electromagnetic interferences may further undermine the usage of the conventional remotely controllable receptacle system.

More specifically, when any one of the receptacle devices 13a, 13b and 13c is not within the transmission range, the remote control device 11 may not control the operations of that particular receptacle device while also lacking any knowledge of whether any receptacle device is under control.

SUMMARY OF THE INVENTION

One objective of the present invention is to functionally extend the effective transmission range of the remote control device.

The remotely controllable receptacle system includes a remote control device comprising a first wireless transceiver module for emitting a first request signal and a searching signal, and a plurality of receptacle devices for emitting a first reply signal according to the first request signal wherein each receptacle device comprises a second wireless transceiver module. The remote control device determines whether the first reply signal is received and the receptacle device emitting the first reply signal is classified as the vicinity receptacle device and the receptacle device not emitting the first reply signal is classified as the missing receptacle device.

The vicinity receptacle device is configured to emit a second request signal according to the searching signal and determine whether the missing receptacle device emits a second reply signal according to the second request signal before a mutual communication between the remote control device and the missing receptacle device via the vicinity receptacle device is established.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 2:
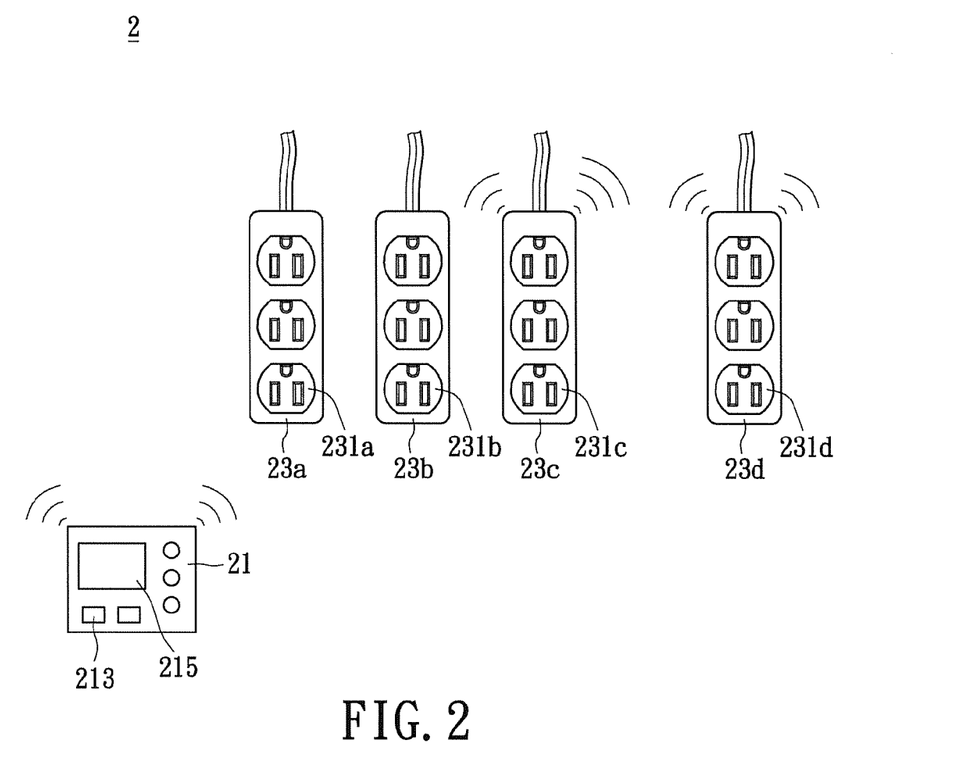
FIG. 2 is a schematic diagram of a remotely controllable receptacle system in accordance with one embodiment of the present invention.

FIG. 2 is a schematic diagram of a remotely controllable receptacle system in accordance with one embodiment of the present invention.

Throughout the disclosure, the remotely controllable receptacle system 2 includes a remote control device 21 and a plurality of receptacle devices 23a, 23b, 23c and 23d. The remote control device 21 configures an input unit 213 and a display unit 215 wherein the input unit 213 could be a button, a knob or a touch panel, and the display unit 215 could be a digital or needle display unit. In one implementation, the digital display unit 215 is a liquid crystal display panel. The pluralities of receptacle devices 23a, 23b, 23c and 23d have power output units 231a, 231b, 231c and 231d, respectively. In one implementation, the plurality of power output units 231a, 231b, 231c and 231d are plug sockets.

The remote control device 21 could transmit and receive a signal and the remote control device 21 could monitor and control the pluralities of receptacle devices 23a, 23b, 23c and 23d located within a transmission range of the remote control device 21. Thus, the remote control device 21 may control the operations of the receptacle devices 23a, 23b, 23c and 23d so that the latter may deliver (or not to deliver) the required power to the electronic devices connected to the receptacle devices 23a, 23b, 23c, and 23d. The remote control device 21 may monitor the power consumption detected by the pluralities of receptacle devices 23a, 23b, 23c and 23d. The pluralities of receptacle devices 23a, 23b, 23c and 23d further detect the real time overload, the voltage spike and the ambient temperature and report the detection result to the remote control device 21 immediately.

The pluralities of receptacle devices 23a, 23b, 23c and 23d are able to communicate with each other. In on implementation, the pluralities of receptacle devices 23a, 23b, 23c and 23d emit a detection signal when they detect an abnormality and/or variation in the real time overload, the voltage spike, and/or the ambient temperature in order to minimize the power consumption of the mutual communication between the remote control device 21 and the pluralities of receptacle devices 23a, 23b, 23c and 23d.

The remote control device 21 controls the operations of the receptacle devices 23a, 23b, 23c and 23d by analyzing the signals from the latter. The remote control device 21 may also calculate the power consumption or carbon footprint and display the same on the display unit 215.

In one implementation, the remote control device 21 may be move around so that the transmission range of the remote control device 21 may change, causing one or more receptacle devices 23a, 23b, 23c and 23d to be outside the transmission range. When the receptacle device is outside the transmission range of the remote control device 21, that particular receptacle device (e.g., the receptacle device 23d) may be considered as the missing receptacle device and other receptacle devices (e.g., 23a, 23b, and 23c) are considered as vicinity receptacle devices.

The remote control device 21 may communicate with the missing receptacle device 23d via one of the vicinity receptacle device 23a, 23b and 23c. For example, the vicinity receptacle 23c may duplicate the signal from the missing receptacle device 23d and relay the same to the remote control device 21.

Figure 3:
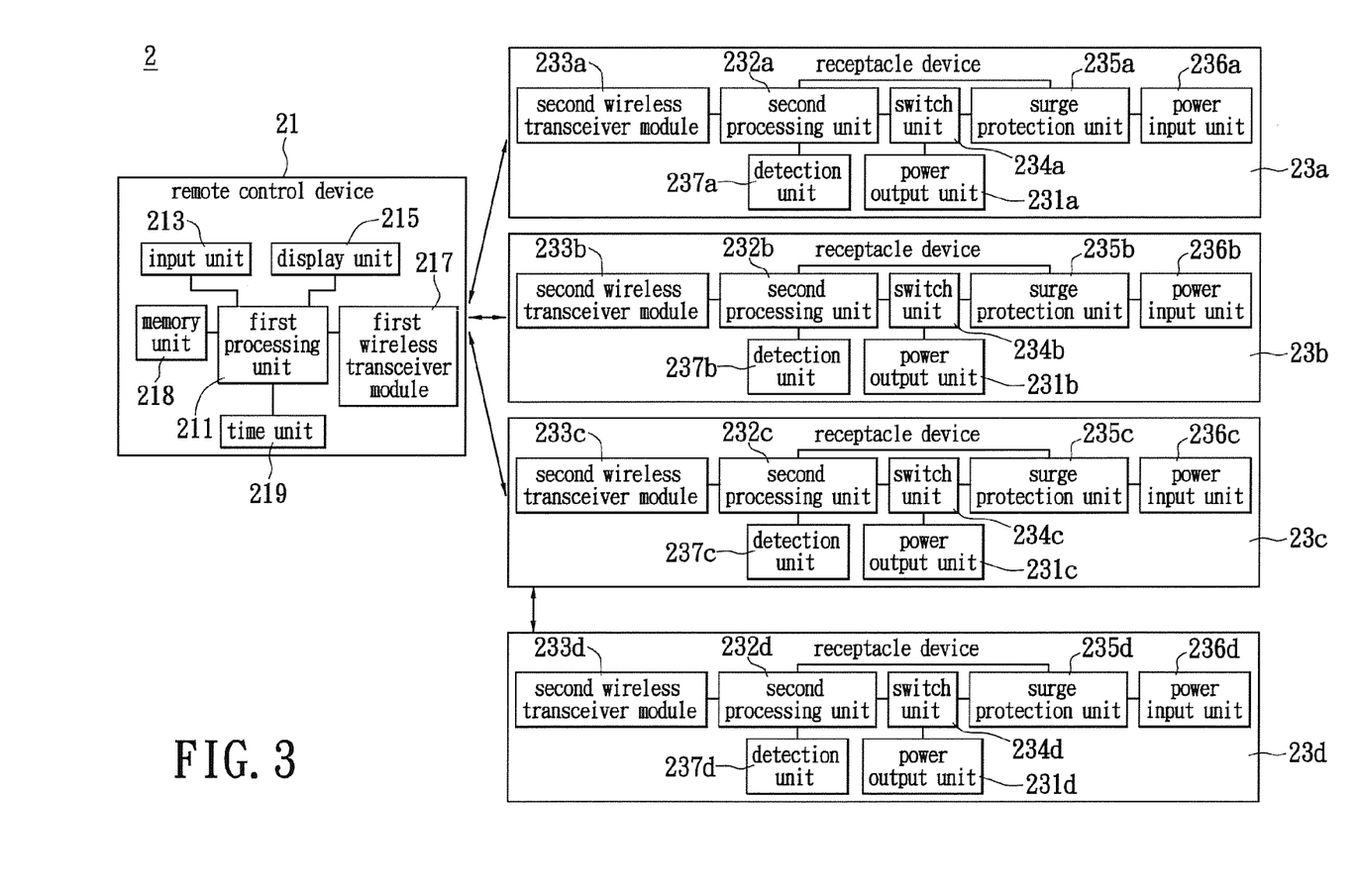
FIG. 3 is a functional block diagram of the remotely controllable receptacle system in accordance with one embodiment of the present invention.

FIG. 3 is a functional block diagram of the remotely controllable receptacle system in accordance with one embodiment of the present invention.

The remote control device 21 has a first processing unit 211, the input unit 213, the display unit 215, a first wireless transceiver module 217, a memory unit 218 and a time unit 219. The pluralities of receptacle devices 23a, 23b, 23c and 23d have power output units 231a, 231b, 231c and 231d, second processing units 232a, 232b, 232c and 232d, second wireless transceiver modules 233a, 233b, 233c and 233d, switch units 234a, 234b, 234c and 234d, surge protection units 235a, 235b, 235c and 235d, power input units 236a, 236b, 236c and 236d, and detection units 237a, 237b, 237c and 237d, respectively.

The first wireless transceiver module 217 may be controlled by the first processing unit 211 before outputting a first wireless signal or receives a second wireless signal from second wireless transceiver modules 233a, 233b, 233c and 233d. The first wireless transceiver module 217 communicates with the second wireless transceiver modules 233a, 233b, 233c and 233d via Bluetooth, Ultra Wide Band or RFID technique.

The memory 218 could be a flash memory unit for storing a setup information and signal information. The setup information may include electricity fees, power consumption or carbon footprint. The signal information is associated with the power consumption corresponding to the pluralities of receptacle devices 23a, 23b, 23c and 23d that is detected and transmitted by the second wireless signal. Additionally, the time unit 219 is configured to generate a time signal.

The power input units 236a, 236b, 236c and 236d is connected with commercial power via an electric wire (not shown) and a plug (not shown) for delivering a power supply. The surge protection units 235a, 235b, 235c and 235d may avoid the surge from damaging the electrical equipment connected with the pluralities of receptacle devices 23a, 23b, 23c and 23d. The switch units 234a, 234b, 234c and 234d are configured to control the power output units 231a, 231b, 231c and 231d according to the operation of the second processing units 232a, 232b, 232c and 232d. The detection units 237a, 237b, 237c and 237d are configured to detect the overload, the voltage spike, and ambient temperature according to the operation of the second processing units 232a, 232b, 232c and 232d.

The second processing units 232a, 232b, 232c and 232d are configured to control detection modes of the detection units 237a, 237b, 237c and 237d or control the operations of the switch units 234a, 234b, 234c and 234d according to the first wireless signal received by the second wireless transceiver modules 233a, 233b, 233c and 233d. The second wireless transceiver modules 233a, 233b, 233c and 233d, which are controlled by the second processing units 232a, 232b, 232c and 232d, are configured to further transmit the detection signal from the detection units 237a, 237b, 237c and 237d.

The remote control device 21 may emit a first request signal to the pluralities of receptacle devices 23a, 23b, 23c and 23d in a predetermined sequence. In one implementation, the remote control device 21 may emit the first request signal to the receptacle devices 23a, 23b, 23c, and 23d in turn. The receptacle devices 23a, 23b, 23c and 23d may emit a first reply signal according to the first request signal. The remote control device 21 determines whether the first wireless transceiver 217 receives the first reply signal. If one of the receptacle devices 23a, 23b, 23c and 23d does not respond to the first request signal with emitting the first reply signal, that particular receptacle device may be considered as the missing receptacle device. Other receptacle devices that respond to the first request signal with emitting the first reply signal may be classified as the vicinity receptacles. Above classification for the missing receptacle device and the vicinity receptacle device is temporarily stored in the memory unit 218.

If the receptacle device 23d does not respond to the first reply signal, the remote control device 21 may emit a searching signal to the vicinity receptacle devices 23a, 23b and 23c in turn. The vicinity receptacle devices 23a, 23b and 23c may search for the missing receptacle device 23d according to the searching signal. The process of searching for the missing receptacle device 23d includes causing the vicinity receptacle devices 23a, 23b, and 23c to emit a second request signal according to the searching signal. If the missing receptacle device 23d is located within the effective transmission range of one of the vicinity receptacle devices 23a, 23b and 23d, the missing receptacle device 23d may emit a second reply signal according to the second request signal. Thereafter, when the vicinity receptacle device 23c receives the second reply signal, which is indicative of locating the missing receptacle device 23d has been accomplished, the remote control device 21 may stop emitting the searching signal for the missing receptacle device 23d. Thus, the remote control device 21 may communicate with the missing receptacle 23d via the vicinity receptacle device 23c.

When the detection unit 237d of the missing receptacle device 23d detects an abnormality or variation in the real time overload, the voltage spike, and/or the ambient temperature, the missing receptacle device 23d may emit a first detection signal. The vicinity receptacle device 23c may duplicate and modulate the first detection signal into a second detection signal upon a receipt of the first detection signal, and delivers the second detection signal to the remote control device 21. The first processing unit 211 may compare the second detection signal with the setup signal stored in the memory unit 217 before generating a first judging signal.

The remote control device 21 may further emit a first command signal according to an operating command received from the input unit 213 or the first judging signal from the first processing unit 211. The vicinity receptacle device 23c may duplicate and modulate the first command signal into a second command signal and delivers the second command signal to the missing receptacle device 23d. The second processing unit 232d may control the switch unit 234d by turning on/off the switch unit 234d or setting a timer for the switch unit 234d according to the second command signal. Thereby, the remote control device 21 could control the missing receptacle device 23d via the vicinity receptacle 23c.

On the other hand, if the remote control device 21 does not determine whether any receptacle device is the missing receptacle device proactively, the pluralities of receptacle device 23a, 23b, 23c and 23d may communicate with the remote control device 21 by communicating with each other. More specifically, the pluralities of receptacle devices 23a, 23b, 23c and 23d may emit a third request signal to the remote control device 21 and determine whether any receptacle device is not located in the effective transmission range of the remote control device 21 on basis of whether any receipt of a third reply signal from the remote control device 21.

If the receptacle device 23d does not receive the third reply signal, the receptacle device 23d may be classified as the missing receptacle device, while the receptacle devices 23a, 23b and 23c that do receive the third reply signal from the remote control device 21 may be classified as the vicinity receptacle devices.

The missing receptacle device 23d may then search for the vicinity receptacle devices 23a, 23b and 23c by emitting a fourth request signal, and communicates with the remote control device 21 via one of the vicinity receptacle devices 23a, 23b and 23c when one of those vicinity receptacle devices 23a, 23b, and 23c responds a fourth reply signal according to the fourth request signal. If the vicinity receptacle 23c.

The missing receptacle device 23d may emit a third detection signal after detecting an abnormality and/or variation in the real time overload, the voltage spike, and/or the ambient temperature. The vicinity receptacle device 23c relative to the missing receptacle device 23d may duplicate and modulate the third detection signal into a fourth detection signal and transfers the fourth detection signal to the remote control signal 21. The first processing unit 211 may emit a second judging signal by comparing the fourth detection signal with the setup signal stored in the memory 218.

The remote control device 21 may emit a third command signal according to the operating command received by the input unit 213 or the second judging signal from the first processing unit 211. The vicinity receptacle device 21c may duplicate and/or modulate the third command signal into a fourth command signal and transfers the fourth command signal to the missing receptacle device 23d in order to cause the missing receptacle device 23d to turn on/off the switch unit 234d. Thereby, the remote control device 21 may control the missing receptacle device 23d.

Figure 4:
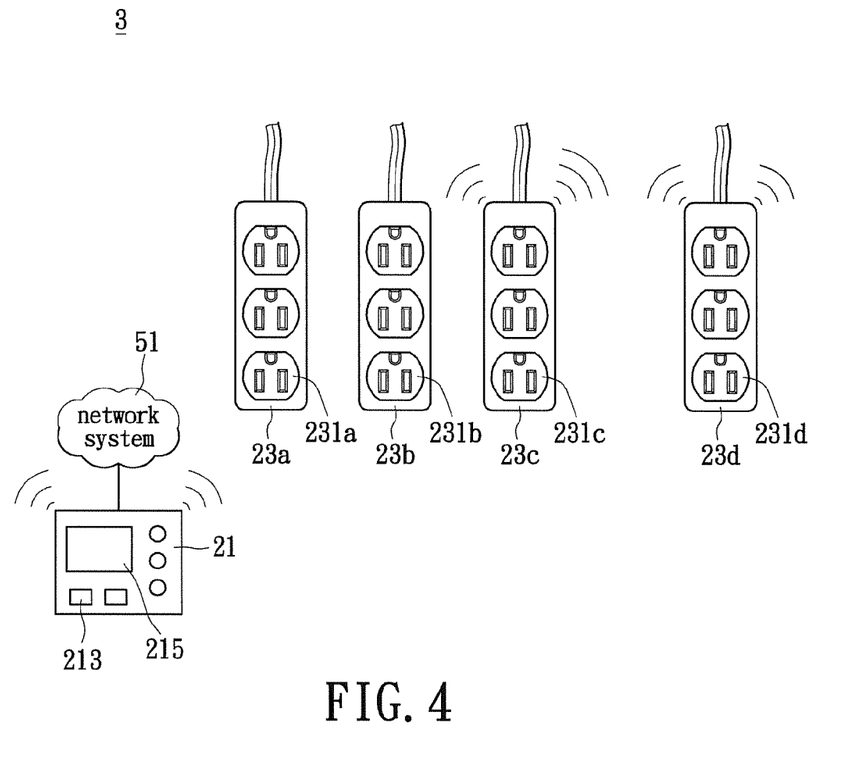
FIG. 4 is a schematic diagram of the remotely controllable receptacle system in accordance with one embodiment of the present invention.

FIG. 4 is a schematic diagram of the remotely controllable receptacle system in accordance with one embodiment of the present invention.

The remotely controllable receptacle system 3 in FIG. 4 is similar to the remotely controllable receptacle system 2 in FIG. 2 while the remote control device 21 of the remotely controllable receptacle system 3 further includes a network system 51. The network system 51 is a telephone system, a global position system, a personal computer or personal digital assistant. The remote control device 21 downloads and updates the setup information via the network system 51. The pluralities of the receptacle devices 23a, 23b, 23c and 23d may be monitored and remotely controlled via the network system 51.

Figure 5:
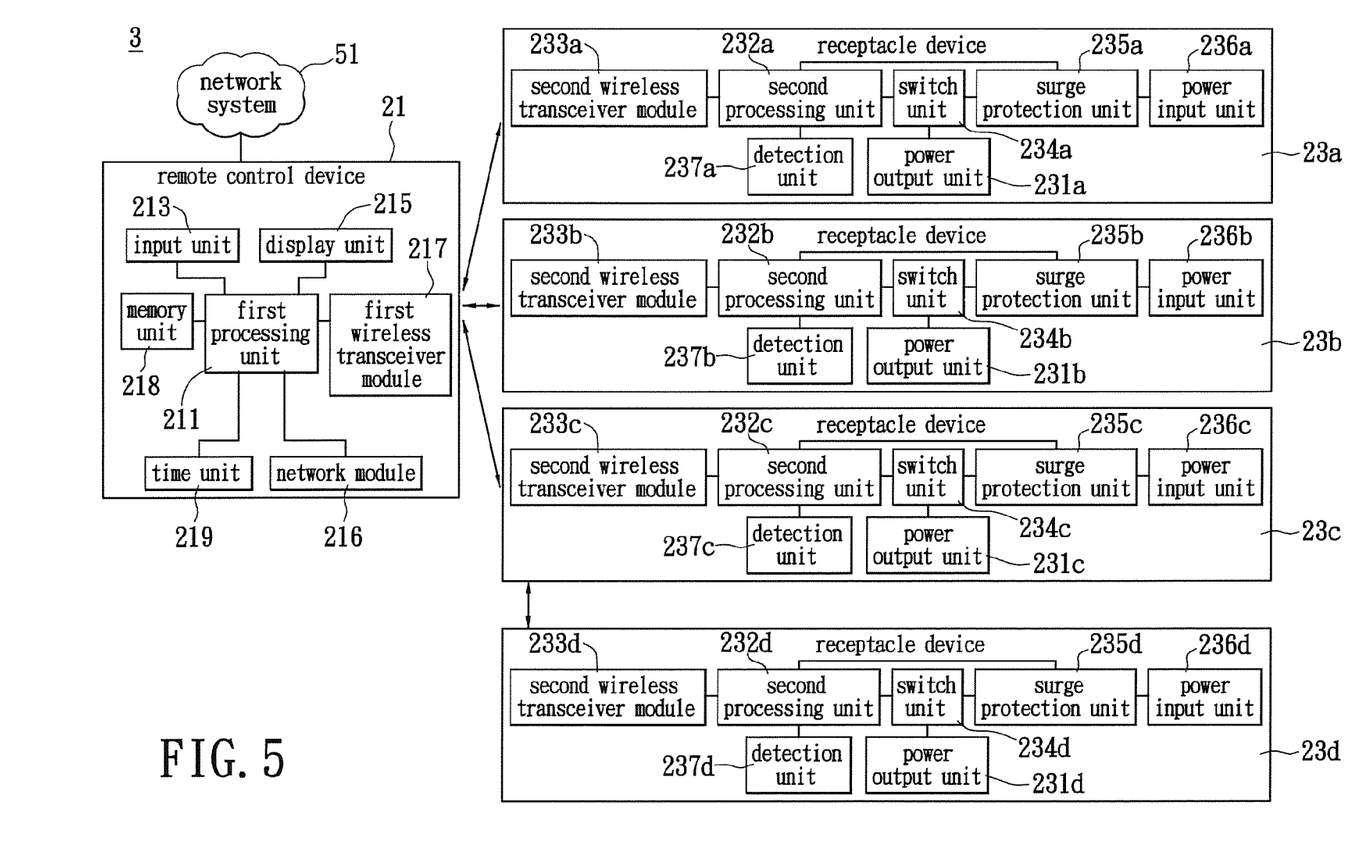
FIG. 5 is a functional block diagram of the remotely controllable receptacle system in accordance with one embodiment of the present invention.

FIG. 5 is a functional block diagram of the remotely controllable receptacle system in accordance with one embodiment of the present invention.

The remote control system 3 in FIG. 5 is similar to the remote control system 2 in FIG. 3 while the remote control device 21 of the remote control system 3 further includes a network module 216 connected with the first processing unit 211. The remote control device 21 is connected with the network system 51 via the network module 216. In one implementation, the network module 216 is an Ethernet card.

Figure 6:
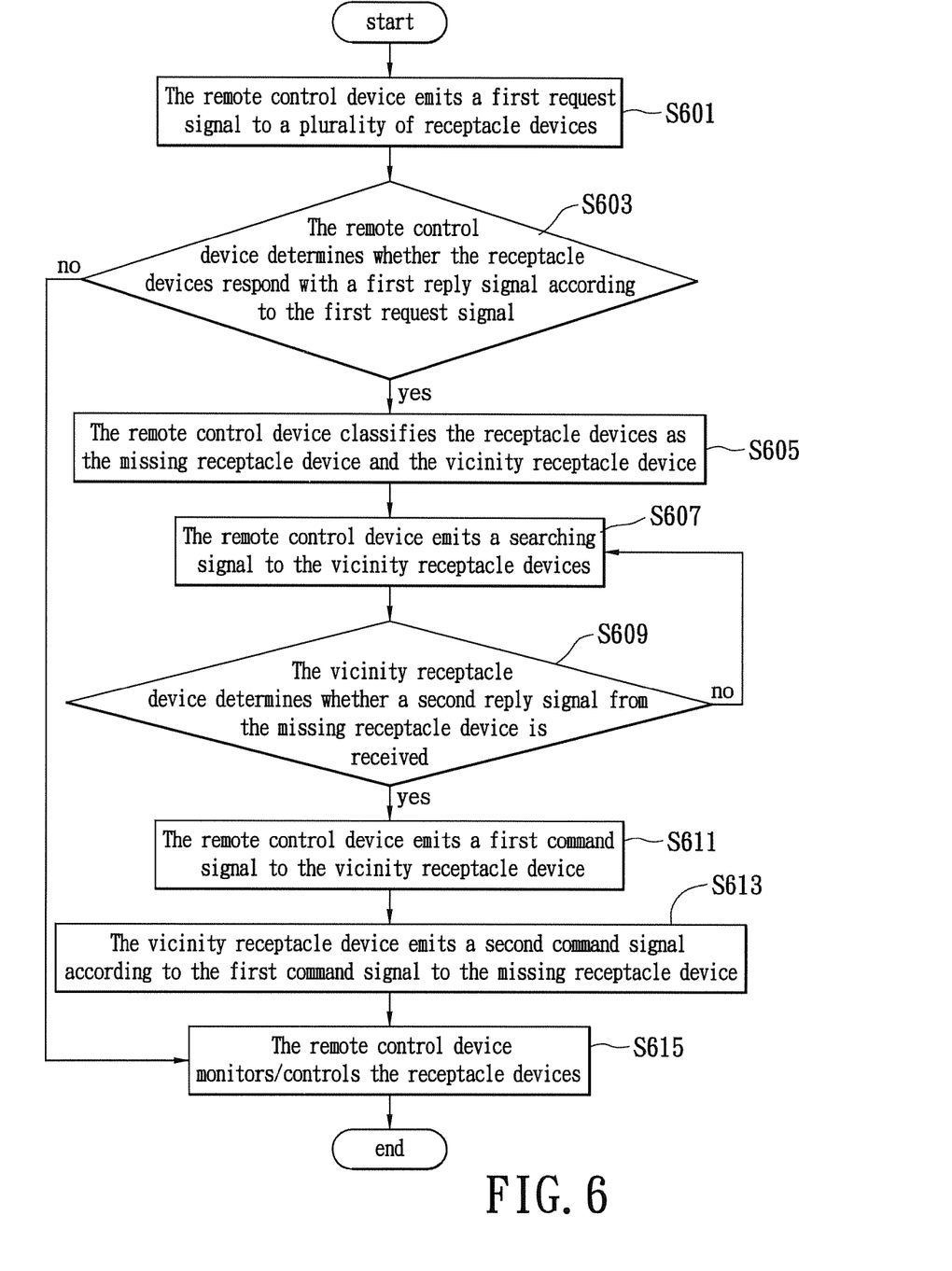
FIG. 6 is a flowchart illustrating a managing method of the remotely controllable receptacle system in accordance with one embodiment of the present invention.

In conjunction with FIG. 3, FIG. 6 is a flowchart illustrating a managing method of the remotely controllable receptacle system in accordance with one embodiment of the present invention.

The remote control device 21 emits the first request signal to the pluralities of receptacle devices 23a, 23b, 23c and 23d (S601). The remote control device 21 determines whether the pluralities of receptacle devices 23a, 23b, 23c and 23d respond with the first reply signal (S603). If all receptacle devices 23a, 23b, 23c and 23d respond with the first reply signal to determine whether the receptacle devices are classified as the missing receptacle device. When all receptacle devices 23a, 23b, 23c, and 23d respond to the first request signal with the first reply signal, they could be monitored and remotely controlled by the remote control device 21 (S615).

If one of the pluralities receptacle devices 23a, 23b, 23c and 23d (such as the receptacle device 23d) does not respond with the first reply signal, the remote control device 21 classifies the receptacle device 23d as the missing receptacle device and the receptacle devices 23a, 23b and 23c as the vicinity receptacle devices (S605). The remote control device 21 emits the searching signal to the vicinity receptacle devices 23a, 23b, and 23c in turn (S607). The vicinity receptacle devices 23a, 23b and 23c emit the second request signal to the missing receptacle device 23d and determine whether the missing receptacle device 23d responds to the second request signal with the second reply signal by determining whether the second reply signal is received (S609). If one of the receptacle devices 23a, 23b and 23c (such as the receptacle device 23c) receives the second reply signal, which is indicative of that the receptacle device 23d is located, the remote control device 21 stops emitting the searching signal. If all receptacle devices 23a, 23b and 23c do not receive the second reply signal, the remote control device 21 may cause the remotely controllable receptacle systems 2 and 3 to be reset by issuing a warning to operators.

After the remote control device 21 establishing the communication with the missing receptacle device 23d, the remote control device 21 emits the first command signal to the vicinity receptacle device 23c (S611). The vicinity receptacle device 23c duplicates and modulates the first command signal into the second command signal and delivers the second command signal to the missing receptacle device 23d (S613).

The remote control device 21 also controls the operations of the vicinity receptacle devices 23a, 23b and 23c.

Figure 7:
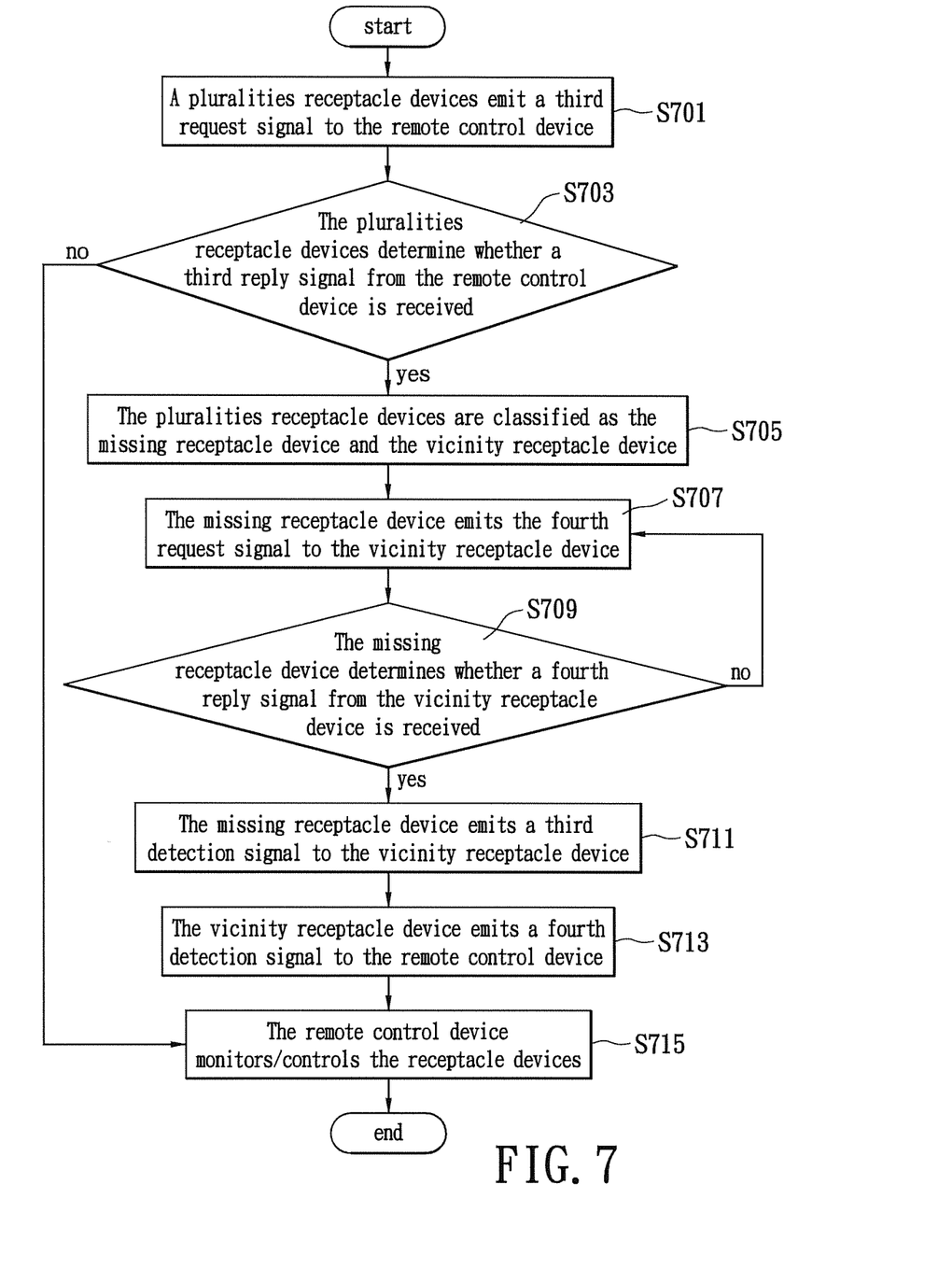
FIG. 7 is a flowchart illustrating a managing method of the remotely controllable receptacle system in accordance with one embodiment of the present invention.

In conjunction with FIG. 3, FIG. 7 is a flowchart illustrating a managing method of the remotely controllable receptacle system in accordance with one embodiment of the present invention.

When the remote control device 21 does not proactively determine whether any receptacle device is classified as the missing receptacle device. The receptacle device 23a, 23b, 23c and 23d may communicate with the remote control device 21 by mutually communicating with each other. The receptacle devices 23a, 23b, 23c and 23d emit the third request signal to the remote control device 21 (S701). The receptacle devices 23a, 23b, 23c and 23d determine whether the third reply signal from the remote control device 21 is received (S703) (i.e., the receptacle devices 23a, 23b, 23c, and 23d are within the effective transmission range of the remote control device 21). If all receptacle devices 23a, 23b, 23c and 23d receive the third reply signal, the remote control device 21 may in turn monitor and remotely control the receptacle devices 23a, 23b, 23c and 23d (S715).

If one receptacle device (such as the receptacle device 23d) does not receive the third reply signal, the receptacle devices 23a, 23b, and 23c may be classified as the vicinity receptacle device while the receptacle device 23d is classified as the missing receptacle device (S705). The receptacle device 23d emits the fourth request signal to the vicinity receptacle devices 23a, 23b and 23c to search which vicinity receptacle device may be capable of communicating with the missing receptacle device 23d (S707). The missing receptacle device 23d determines whether the fourth reply signal from the vicinity receptacle devices 23a, 23b and 23c is received (S709). If one of the vicinity receptacle devices 23a, 23b and 23c (such as the vicinity receptacle device 23c) emits the fourth reply signal that is received by the missing receptacle device 23d, the missing receptacle device 23d stops emitting the fourth request signal. Thereby, the missing receptacle device 23d may communicate with the vicinity receptacle device 23c and the remote control device 21.

The missing receptacle device 23d emits the third detection signal to the vicinity receptacle device 23c (S711). The vicinity receptacle device 23c duplicates and modulates the third detection signal into the fourth detection signal and delivers the fourth detection signal to the remote control device 21 (S713). The remote control device 21 monitors and remotely controls the missing receptacle device 23d according to the fourth detection signal.

To sum up, the present invention utilizes mutually communication between the receptacle devices to extend the effective transmission range of the remote control device.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A managing method adapted for a remotely controllable receptacle system having a remote control device and a plurality of receptacle devices, the managing method comprising:
    emitting a third request signal to the remote control device by the plurality of the receptacle devices;
    determining whether a third reply signal from the remote control device is received by the plurality of receptacle devices;
    classifying the receptacle device receiving the third reply signal as a vicinity receptacle device and the receptacle device not receiving the third reply signal as a missing receptacle device;
    searching for the vicinity receptacle device by the missing receptacle; and
    establishing a mutual communication with the remote control device by the missing receptacle device via the vicinity receptacle device.

2. The method as claimed in claim 1, wherein searching for the vicinity receptacle device further comprises;
    emitting a fourth request signal to the vicinity receptacle device by the missing receptacle device; and
    determining whether a fourth reply signal from the vicinity receptacle device is received by the missing receptacle device.

3. The method as claimed in claim 2, wherein establishing the mutual communication with the remote control device further comprises communicating with the remote control device via the vicinity receptacle device emitting the fourth reply signal.

4. The method as claimed in claim 3, further comprising:
    emitting a third detection signal to the vicinity receptacle device by the missing receptacle device; and
    emitting a fourth detection signal according to the third detection signal to the remote control device by the vicinity receptacle device searched by the missing receptacle device.

* * * * *